(12) United States Patent
Woronuk

(10) Patent No.: US 10,988,622 B2
(45) Date of Patent: Apr. 27, 2021

(54) TEMPORARY PROTECTIVE COATING AND REMOVAL SYSTEM

(71) Applicant: TSYTEX E-COATINGS INC., Surrey (CA)

(72) Inventor: Alexander Dean Woronuk, Surrey (CA)

(73) Assignee: TSYTEX E-COATINGS INC.

(*) Notice: Subject to any disclaimer, the term of this patent is extended or adjusted under 35 U.S.C. 154(b) by 0 days.

(21) Appl. No.: 16/446,077

(22) Filed: Jun. 19, 2019

(65) Prior Publication Data
US 2019/0300719 A1 Oct. 3, 2019

Related U.S. Application Data

(63) Continuation of application No. 15/124,222, filed as application No. PCT/CA2015/050172 on Mar. 6, 2015, now abandoned.

(60) Provisional application No. 61/949,518, filed on Mar. 7, 2014.

(51) Int. Cl.
*C03C 17/32* (2006.01)
*C09D 5/00* (2006.01)
*C09D 133/00* (2006.01)
*C09D 133/02* (2006.01)

(52) U.S. Cl.
CPC .............. *C09D 5/008* (2013.01); *C03C 17/32* (2013.01); *C09D 5/00* (2013.01); *C09D 133/00* (2013.01); *C09D 133/02* (2013.01); *C03C 2217/78* (2013.01)

(58) Field of Classification Search
None
See application file for complete search history.

(56) References Cited

U.S. PATENT DOCUMENTS

| 3,489,708 | A | * | 1/1970 | Isaksen | C09D 131/04 524/91 |
| 3,979,352 | A | * | 9/1976 | Brady | C08F 220/02 524/766 |
| 4,540,736 | A |   | 9/1985 | Herten et al. | |
| 5,055,132 | A | * | 10/1991 | Fernandez | C09D 133/064 106/10 |
| 5,753,758 | A | * | 5/1998 | Marchese | C09D 133/06 525/201 |
| 8,216,678 | B2 |  | 7/2012 | Woronuk et al. | |
| 2002/0176988 | A1 |  | 11/2002 | Medwick et al. | |
| 2011/0177324 | A1 |  | 7/2011 | Zagdoun et al. | |
| 2011/0287187 | A1 | * | 11/2011 | Kohnke | C08K 5/521 427/427.4 |

FOREIGN PATENT DOCUMENTS

| CA | 1261525 | 9/1989 |
| CA | 2123206 | 4/1993 |
| CA | 2751832 | 9/2010 |
| WO | 2012162641 | 11/2012 |

OTHER PUBLICATIONS

International Searching Authority, "Search Report & Written Opinion," issued in connection with International Application No. PCT/CA2015/050172, dated Sep. 11, 2015, 9 pages.
International Searching Authority, "International Preliminary Report on Patentability" issued in connection with International Application No. PCT/CA2015/050172, dated Jun. 14, 2016, 20 pages.

* cited by examiner

*Primary Examiner* — Sheeba Ahmed
(74) *Attorney, Agent, or Firm* — Nyemaster Goode P.C.

(57) ABSTRACT

A coating composition for providing a temporary protective coating onto a surface of a building construction element, such as a glass window. The coating composition comprises an alkali-soluble resin comprising an acrylic polymer or copolymer. The temporary protective coating is fully soluble in and removable from the surface using an aqueous alkali solution. The invention also provides a system for providing a temporary protective coating onto a surface of a building construction element and for controllably removing said temporary protective coatings. The system includes a coating composition and a stripper comprising an aqueous alkali solution. The coating composition comprises an alkali-soluble resin comprising an acrylic polymer or copolymer.

18 Claims, No Drawings

TEMPORARY PROTECTIVE COATING AND REMOVAL SYSTEM

RELATED APPLICATIONS

This application is a continuation of U.S. patent application Ser. No. 15/124,222, filed Sep. 7, 2016, entitled TEMPORARY PROTECTIVE COATING AND REMOVAL SYSTEM, which claims the benefit of priority to International Patent Application No. PCT/CA2015/050172, filed Mar. 6, 2015, entitled TEMPORARY PROTECTIVE COATING AND REMOVAL SYSTEM, which claims the benefit of priority to U.S. Provisional Patent Application No. 61/949,518, filed Mar. 7, 2014, entitled TEMPORARY PROTECTIVE COATING AND REMOVAL SYSTEM, the entire disclosures of which are incorporated herein by reference in their entireties.

TECHNICAL FIELD

The present invention relates to water resistant, alkali-soluble temporary coatings for protecting building construction elements, including glass and other fragile surface substrates, against scratching, concrete (calcium and lime), chemicals such as acid washes for brick mortar, paints, caulking products such as silicones that react with substrates, and abrasion damage. More particularly, this invention relates to temporary coatings configured for application as solutions that dry to form protective coatings overlaying substrate surfaces, and stripping compositions configured for controllably removing the protective coatings.

BACKGROUND OF THE INVENTION

With the increasing demand for environmentally safer products in workplace environments new stringent guidelines are being imposed on volatile organic compound (VOC) emissions and waste residual components from the use of products. It is desirable that products have no or low VOC, e.g. ≤30 grams/liter (about 3 wt. % for products having specific gravities of about 1), and be partially or completely biodegradable.

The prior art describes non-water resistant or only partially alkali-soluble temporary coatings for protecting glass and other surface substrates against scratching and abrasion damage. For example, WO 2007/085080, Woronuk et al., describes coating compositions that are only partially alkali-soluble and may leave residues during alkali stripping. Alkali stripping is particularly problematic and residues are often left where the temporary coatings have aged and/or have been exposed to atmospheric conditions. Furthermore, the coating compositions have high VOC contents, i.e., exceeding current requirements of less than 30 grams/liter, due to the presence of volatile solvents, including methanol, ethanol, propanol, butanol, etc. US 2011/0177324, Zagdoun et al., describes temporary coatings which are not water resistant (e.g. to rain) and are not alkali soluble. Such coatings would be highly undesirable for outdoor use (e.g. exterior window glass in buildings). They are also limited for use in glass fabricating, as water is often used for drilling, grinding and washing glass and it removes the coating in part or completely. Furthermore, coated glass can be affected by humidity and salt fog during transportation.

SUMMARY OF THE INVENTION

According to one aspect of the invention there is provided a coating composition for providing a temporary protective coating onto a surface of a building construction element, including building fenestration. The coating composition comprises an alkali-soluble resin comprising an acrylic polymer or copolymer. The temporary protective coating is fully soluble in and removable from the surface using an aqueous alkali solution.

In an embodiment of the invention, the temporary protective coating is removable from the surface after a period of at least three, six, twelve or twenty-four months. The temporary protective coating is removable from the surface after exposure to exterior atmospheric conditions throughout the time period.

In another an embodiment of the invention, the acrylic polymer or copolymer comprises 2-propenoic acid, 2-methyl-, polymer with ethenylbenzene, ethyl 2-propenoate, methyl 2-methyl-2-propenoate and 1,2-propanediol mono (2-methyl-2-propenoate).

According to another aspect of the invention there is provided a system for providing a temporary protective coating onto a surface of a building construction element and for controllably removing said temporary protective coatings. The system comprises a coating composition and a stripper comprising an aqueous alkali solution. The coating composition comprises an alkali-soluble resin comprising an acrylic polymer or copolymer. The temporary protective coating is fully soluble in and removable from the surface using the aqueous alkali solution.

Further aspects of the invention and features of specific embodiments of the invention are described below.

DETAILED DESCRIPTION

The invention provides temporary protective coatings designed to protect fragile or high gloss surfaces of building construction elements, including glass or smart glass, building fenestration, building construction elements having surfaces of glass, ceramic, vinyl, fiberglass, painted aluminum, anodized aluminum, or stainless steel, and including the specialized sensitive coatings that are commonly applied to annealed glass and other substrates. The sensitive coatings include pyrolytic coatings, but are most commonly applied by sputter vacuum coaters (i.e., include vacuum deposition coatings). These sensitive coatings provide a variety of usable functions in the glass industry such as in "self-cleaning" glass which is typically coated with titanium dioxide, low emissivity coatings ("low-E") and electric current conductive coatings used for smart glass electrochromatic glass. The sensitive coatings are very sensitive to chemical reactions with air (oxidation), water and sunlight, especially UV radiation. These specialized sensitive coatings are often damaged in transportation, during fabrication into other glass products, after installation on structures under construction, or simply deteriorate due to the environment. The invention provides temporary protective coatings that are removable. The temporary coatings can be removed by a variety of methods depending on the coating composition for the required protection. In some cases they may be removed during the automated (machine) glass washing process; in other cases they may be removed manually with or without industrial chemical release agents, or the coatings may be vaporized within a tempering furnace.

The temporary protective coatings can be used to protect chemically sensitive titanium dioxide coatings, fragile or high gloss surfaces such as glass, metal, and other substrates against abrasion, chemical damage, debris and environmental damage.

The temporary protective coating compositions include low or no VOC and are partially or totally biodegradable. They are free of heavy metals and ammonia and comprise an alkali-soluble resin comprising an alkali-soluble polymer or copolymer as an essential component. The temporary protective coating compositions may optionally also include water, solvents, surfactants, acrylic polymers or copolymers, non-acrylic polymers or copolymers, plasticizers, leveling agents, biocides, and defoamers.

The alkali-soluble polymer or copolymer includes alkali-soluble acrylic polymer or copolymer water-based dispersions such as Tsytex AC 780 (trademark) supplied by Ecocoat Glass Protection Systems Inc. and/or Tsytex E-Coatings Inc. of Whiterock, British Columbia, Canada, and Syntran 1560 (trademark) made by Interpolymer Corporation, Canton, Mass. The alkali-soluble acrylic polymer or copolymer may comprise 2-propenoic acid, 2-methyl-, polymer with ethenylbenzene, ethyl 2-propenoate, methyl 2-methyl-2-propenoate and 1,2-propanediol mono (2-methyl-2-propenoate). Coating compositions which exclude an alkali-soluble polymer or copolymer are not 100% soluble in aqueous alkaline solutions and become increasingly difficult to remove completely from a surface over time and exposure to the environment. In contrast, the temporary protective coatings of the present invention are alkali-soluble and completely removable from a surface of a building construction element without leaving residues after a substantial period of time, for example at least three months, or at least six or twelve months, or longer. Furthermore, the temporary protective coatings are removable where the coatings are exposed to exterior atmospheric conditions throughout the above periods.

Solvents for use in the coating compositions include glycol ethers for example diethylene glycol monoethylether from the Dow Chemical Company of Calgary, Alberta, Canada or Glycolether DE (trademark) from the Dow Chemical Company. The purpose of the solvent is to homogenize the formula.

Surfactants for use in the coating compositions include Bio-soft N25-7 (trademark) from Stepan Company of Northfield, Ill., and Tomadol 23-3 (trademark) from Air Products and Chemicals, Inc. of Allentown, Pa. The surfactant helps emulsify the alkali-soluble polymer or copolymer and optionally one or more of the other components.

Non-acrylic polymer or copolymer dispersions for use in the compositions include ethylene copolymers such as Syntran 6160 WE (trademark) from Interpolymer Corporation of Canton, Mass. Syntran 6160 WE increases the abrasion resistance and durability of the critical coating, e.g. in areas susceptible to dust storms or sand storms.

Acrylic polymers or copolymers include olefin-acrylate copolymer dispersions such as Syntran PA-1465 (trademark) from Interpolymer Corporation or acrylic copolymer dispersions such as Syntran AX 253-86 (trademark). Syntran AX 253-86 improves the water resistance and bonding to glass. Syntran 1560 improves the removability of Syntran AX 253-86 by an aqueous alkali solution. Syntran PA-1465 improves the abrasion resistance and durability of the coating composition especially when used in combination with Syntran AX 253-86. This is important when mechanical equipment with suction cups is used to lift and move large sheets of glass.

Plasticizers and leveling agents include tris-(2-butoxyethyl) phosphate ("TBEP"), e.g. from Ashland Chemical of Covington, Ky., which produce formulas having better emulsion of the polymers or copolymers in water and more even coatings on surfaces.

Biocides include Stircide DMDMH (trademark) from Univar Inc. of Downers Grove, Ill. Biocides increase the shelf life and bio-contamination of the coatings compositions, e.g. during storage.

Defoamers include non-silicone, water dispersible types such as Suppressor 2333 (trademark) from Hydrite Chemical Co. of Brookfield, Wis. Defoamers reduce or eliminate air bubbles in sprayed temporary coatings.

The invention also provides a stripper to be applied to the temporary protective coatings to convert the temporary protective coatings into semi-solid gel-like materials that are easily solubilized or emulsified and removable by a stream of water. Preferred strippers are aqueous alkaline solutions having a pH>7 to ≤11. Aqueous alkaline solutions are more safe for the workers handling them and on the glass or other surface of a building construction element than prior art high pH strippers (e.g. having pH 13). Examples of suitable strippers include the following:

Burlesque (trademark) manufactured by Maxim Technologies Inc. of Delta British Columbia, Canada containing 5-10 wt. % monoethanolamine, 1-5 wt. % caprylic acid, 5-10 wt. % ethylene glycol monophenyl ether. pH 10.5±0.5.

Mr. Clean Outdoor Spray (trademark) manufactured by Procter & Gamble of Cincinnati, Ohio containing 0.5-1.5 wt. % sodium alkylbenzene sulphonate, 7-13 wt. % butyl carbitol. pH 10.4.

Windex Original Formula (trademark) manufactured by S.C. Johnson & Son, Inc. of Brantford, Ontario, Canada. pH of 10.7.

The following non-limiting examples illustrate embodiments of the invention:

EXAMPLE 1

The following low VOC coating composition was prepared for coating ordinary glass.

| | | Composition wt. % |
|---|---|---|
| Water | | 47.38 |
| Solvent | Diethylene glycol monoethylether* | 2.88 |
| Plasticizer/Leveling Agent | TBEP** | 3.33 |
| Surfactant | Biosoft N-25-7*** | 0.73 |
| Alkali-soluble acrylic copolymer | Tsytex AC 780**** | 2.0 |
| Acrylic copolymer | Tsytex AC 1170**** | 39.41 |
| Olefin-acrylate copolymer | Tsytex AC 2070**** | 2.19 |
| Ethylene copolymer | Tsytex AC 3220**** | 2.08 |

*Supplied by the Dow Chemical Company.
**Supplied by Ashland Chemical.
***Supplied by Stepan Company.
****Supplied by Ecocoat Glass Protections Systems Inc. and/or Tsytex E-Coatings Inc.

EXAMPLE 2

The following low VOC coating composition was prepared for coating titanium dioxide-coated glass.

| | | Composition wt. % |
|---|---|---|
| Water | | 47.06 |
| Solvent | Diethylene glycol monoethylether* | 2.88 |

-continued

|  |  | Composition wt. % |
|---|---|---|
| Plasticizer/Leveling Agent | TBEP** | 3.33 |
| Surfactant | Tomadol 23-3*** | 0.5 |
| Surfactant | Biosoft N-25-7**** | 0.55 |
| Alkali-soluble acrylic copolymer | Tsytex AC 780***** | 2.0 |
| Acrylic copolymer | Tsytex AC 1170***** | 39.41 |
| Olefin-acrylate copolymer | Tsytex AC 2070***** | 2.19 |
| Ethylene copolymer | Tsytex AC 3220***** | 2.08 |

*Supplied by the Dow Chemical Company.
**Supplied by Ashland Chemical.
***Supplied by Air Products and Chemicals, Inc.
****Supplied by Stepan Company.
*****Supplied by Ecocoat Glass Protections Systems Inc. and/or Tsytex E-Coatings Inc.

EXAMPLE 3

The following low VOC coating composition was prepared for coating low-emissivity glass.

|  |  | Composition wt. % |
|---|---|---|
| Water |  | 9.57 |
| Solvent | Diethylene glycol monoethylether* | 1.11 |
| Plasticizer/Leveling agent | TBEP** | 0.96 |
| Surfactant | Biosoft N-25-7*** | 0.20 |
| Alkali-soluble acrylic copolymer | Tsytex AC 780**** | 21.50 |
| Polyvinyl alcohol polymer | Tsytex PV Z200**** | 33.33 |
| Polyvinyl alcohol polymer able to crosslink with (alkali-soluble) acrylic polymers | Tsytex PV LW20**** | 33.33 |

*Supplied by the Dow Chemical Company.
**Supplied by Ashland Chemical.
***Supplied by Stepan Company.
****Supplied by Ecocoat Glass Protections Systems Inc. and/or Tsytex E-Coatings Inc.

EXAMPLE 4

The following non-VOC, non-solvent coating composition was prepared for coating low-emissivity glass.

|  |  | Composition wt. % |
|---|---|---|
| Alkali-soluble acrylic copolymer | Tsytex AC 780* | 33.34 |
| Polyvinyl alcohol polymer | Tsytex PV Z200* | 33.33 |
| Polyvinyl alcohol polymer able to crosslink with alkali-soluble acrylic polymer | Tsytex PV LW20* | 33.33 |

*Supplied by Ecocoat Glass Protections Systems Inc. and/or Tsytex E-Coatings Inc.

The coating composition was prepared by the following method. Tsytex PV LW20 was added to a mixer, immersing the mixing blades completely. Tsytex PV LW20 was agitated sufficiently to create a significant vortex, without pulling air into the liquid. Tsytex PV Z200 was added followed by Tsytex AC 780. The mixture was mixed for approximately five minutes before adding Tsytex AC 780. The coating composition was mixed for approximately one hour prior to testing. The coating composition was allowed to equilibrate for at least 16 hours before final use. The temporary protective coating formed on low-emissivity glass using this coating composition was later removed by vaporization during a tempering process.

EXAMPLE 5

The following low VOC coating composition was prepared for coating ordinary glass.

|  |  | Composition wt. % |
|---|---|---|
| Water |  | 46.9 |
| Bactericide | Stircide DMDMH* | 0.08 |
| Solvent | Diethylene glycol monoethylether** | 2.88 |
| Plasticizer/Leveling Agent | TBEP*** | 3.33 |
| Surfactant | Tomadol 23-3**** | 0.5 |
| Surfactant | Biosoft N-25-7***** | 0.55 |
| Alkali-soluble acrylic copolymer | Tsytex AC 780****** | 2.0 |
| Acrylic copolymer | Tsytex AC 1170****** | 39.41 |
| Olefin-acrylate copolymer | Tsytex AC 2070****** | 2.19 |
| Ethylene copolymer | Tsytex AC 3220****** | 2.08 |
| Defoamer | Suppressor 2333******* | 0.08 |

*Supplied by Univar Inc.
**Supplied by the Dow Chemical Company.
***Supplied by Ashland Chemical.
****Supplied by Air Products and Chemicals, Inc.
*****Supplied by Stepan Company.
******Supplied by Ecocoat Glass Protections Systems Inc. and/or Tsytex E-Coatings Inc.
*******Supplied by Hydrite Chemical Co.

The coating composition was prepared by the following method. Water and then Stircide DMDMH was added to a mixer, immersing the mixing blades completely. The water and Stircide DMDMH mixture was agitated sufficiently to create a significant vortex, without pulling air into the liquid. The plasticizer/leveling agent, solvent, and surfactants were added and mixed for approximately 20 minutes. The resulting mixture was a uniform emulsion with the hydrophobic plasticizer thoroughly dispersed in the water phase (i.e., no puddling of the plasticizer being evident). Tsytex AC 1170 was then quickly added to the mixture near the vortex avoiding the formation of particulate matter. The mixture was agitated for a minimum of 30 minutes. Tsytex AC 2070 and Tsytex 3220 were then added in sequence, followed by Tsytex AC 780 and Suppressor 2333. The mixture was mixed for approximately five minutes after the addition of each of Tsytex AC 2070 and Tsytex 3220. The coating composition was mixed for approximately one hour prior to testing. The coating composition was allowed to equilibrate for at least 16 hours before final use.

EXAMPLE 6

Dirt and debris are wiped clean from a surface of a glass window to be protected. A coating composition in accordance with any of Examples 1 to 5, comprising an alkali-soluble resin comprising an acrylic polymer or copolymer, is uniformly applied to the surface using an airless spray system or a flow applicator. Approximately 4 to 6 mL of the protective coating is used for each square foot of surface to be protected, yielding a uniform dried thickness of 4 to 6 microns. Alternatively, the coating composition is applied to the surface and uniformly spread across the surface using a painting pad. The coating composition may also be applied by dipping an applicator into the coating composition and uniformly applying the applicator and coating composition across the surface.

The coated surface is then allowed to dry for at least 7-15 minutes depending on environmental conditions and the thickness of the coating composition applied to the surface. The coating composition cures to full strength within approximately 24 hours.

To completely remove the temporary protective coating from the surface, an aqueous alkali solution is applied to the coated surface using a spray system or a non-abrasive cleaning pad and left to rest for at least 15 seconds to convert the alkali-soluble temporary protecting coating into a water-soluble state. Water is then applied and the coating is removed using a non-abrasive cleaning pad. Debris and the aqueous alkali solution are completely washed away with water and/or a damp cloth.

EXAMPLE 7

A coating composition, in accordance with any of Examples 1 to 5, comprising an alkali-soluble resin comprising an acrylic polymer or copolymer, is applied to a surface of a glass window. The coating composition is allowed to dry and cure. The surface remains protected by the temporary protective coating for a period of at least 3 months. In some instances, the coated surface remains protected for at least 6, 12 or 24 months. The coated surface is exposed to exterior atmospheric conditions during part or all of the time period. The temporary protective coating is then completely removed using an aqueous alkali solution according to the procedure described in Example 6.

The invention claimed is:

1. A coating composition for providing a temporary protective coating onto a glass surface of a building construction element, the coating composition having a VOC content of ≤30 grams/litre and comprising an alkali-soluble resin comprising an acrylic polymer or copolymer, the temporary protective coating being fully soluble in and completely removable from the glass surface without leaving residues using an aqueous alkali solution, wherein the coating composition is free of heavy metals and ammonia.

2. The coating composition according to claim 1, wherein the coating composition has a VOC content of ≤20 grams/litre.

3. The coating composition according to claim 1, wherein the coating composition is free of VOC content.

4. The coating composition according to claim 1, wherein the temporary protective coating is removable from the surface after a period of at least three months.

5. The coating composition according to claim 1, wherein the temporary protective coating is removable from the surface after a period of at least six months.

6. The coating composition according to claim 1, wherein the temporary protective coating is removable from the surface after a period of at least twelve months.

7. The coating composition according to claim 6, wherein the temporary protective coating is removable from the surface after exposure to exterior atmospheric conditions throughout said period.

8. The coating composition according to claim 1, wherein the acrylic polymer or copolymer comprises 2-propenoic acid, polymer with ethenylbenzene, ethyl 2-propenoate, methyl 2-methyl-2-propenoate or 1,2-propanediol mono (2-methyl-2-propenoate).

9. The coating composition according to claim 1, wherein the glass surface of the building construction element has one or more of a pyrolytic coating, a vacuum deposition coating, or a titanium dioxide coating.

10. The coating composition according to claim 1, wherein the building construction element comprises glass, smart glass, low-emissivity glass, building fenestration, or a window system.

11. The coating composition according to claim 1, wherein the aqueous alkali solution has a pH≤11.

12. The coating composition according to claim 1, wherein the coating composition further comprises one or more of a plasticizer, a leveling agent, a solvent, a surfactant, water, a biocide, a defoamer, an acrylic copolymer, a polyvinyl alcohol polymer and a polyvinyl alcohol copolymer able to crosslink the acrylic polymer or copolymer, a non-acrylic polymer to increase abrasion resistance, and an olefin-acrylate polymer to increase durability and/or slip resistance.

13. A system for providing a temporary protective coating onto a glass surface of a building construction element and for controllably removing the temporary protective coating, the system comprising a coating composition in accordance with claim 1 and a stripper comprising an aqueous alkali solution.

14. The system according to claim 13, wherein the aqueous alkali solution has a pH ≤11.

15. A building construction element coated with the coating composition of claim 1.

16. A building construction element according to claim 15, wherein the building construction element comprises building fenestration, a window system, or glass.

17. A building construction element according to claim 15, wherein the building construction element has a glass surface with a pyrolytic coating, a vacuum deposition coating or a titanium dioxide coating.

18. A building construction element according to claim 15, wherein the coating has a dried thickness in the range of 4 to 6 microns.

* * * * *